United States Patent
Murao et al.

(10) Patent No.: US 9,289,958 B2
(45) Date of Patent: Mar. 22, 2016

(54) METHOD FOR MANUFACTURING RESIN-MADE ROLLER SHAFT, MOLDING DIE, AND RESIN-MADE ROLLER SHAFT

(71) Applicant: CANON KABUSHIKI KAISHA, Tokyo (JP)

(72) Inventors: Hitoshi Murao, Tokyo (JP); Takashi Arai, Tokyo (JP); Kenji Higashiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/283,395

(22) Filed: May 21, 2014

(65) Prior Publication Data

US 2014/0353111 A1  Dec. 4, 2014

(30) Foreign Application Priority Data

Jun. 3, 2013 (JP) .................. 2013-116687

(51) Int. Cl.
| | |
|---|---|
| B65G 39/02 | (2006.01) |
| B29D 99/00 | (2010.01) |
| B29C 45/14 | (2006.01) |
| B29C 45/26 | (2006.01) |
| B29C 45/27 | (2006.01) |
| B29C 45/33 | (2006.01) |
| B29C 33/00 | (2006.01) |
| B29C 45/00 | (2006.01) |

(52) U.S. Cl.
CPC ...... *B29D 99/0046* (2013.01); *B29C 45/14622* (2013.01); *B29C 45/2681* (2013.01); *B29C 33/005* (2013.01); *B29C 45/0025* (2013.01); *B29C 45/2756* (2013.01); *B29C 45/33* (2013.01); *B29C 2045/0034* (2013.01); *B29C 2045/0077* (2013.01); *B29D 99/0035* (2013.01)

(58) Field of Classification Search
None
See application file for complete search history.

(56) References Cited

U.S. PATENT DOCUMENTS

| | | | | |
|---|---|---|---|---|
| 3,861,955 | A | * 1/1975 | Lemelson | ............ B23K 15/002 101/12 |
| 6,841,114 | B2 | * 1/2005 | Fujiwara | ........... B29C 45/14065 264/327 |
| 6,905,270 | B2 | 6/2005 | Noda et al. | |
| 6,918,708 | B2 | 7/2005 | Noda et al. | |
| 7,381,174 | B2 | 6/2008 | Noda et al. | |
| 7,703,761 | B2 | 4/2010 | Shiraki | |
| 7,741,140 | B2 | 6/2010 | Duggal et al. | |

(Continued)

FOREIGN PATENT DOCUMENTS

| | | |
|---|---|---|
| CN | 1403262 A | 3/2003 |
| CN | 1443639 A | 9/2003 |
| CN | 1453139 A | 11/2003 |

(Continued)

OTHER PUBLICATIONS

First Office Action in Chinese Application No. 201410228905.4 (notified Dec. 31, 2015).

*Primary Examiner* — Kavel Singh
(74) *Attorney, Agent, or Firm* — Fitzpatrick, Cella, Harper & Scinto (57) ABSTRACT

A molding die for molding a resin-made roller shaft therein includes: a cavity for molding the roller shaft therein; and a holding member which is provided on an end of the cavity and holds both ends in an axial direction of the roller shaft, wherein the holding member can rotate the roller shaft around a axis of the roller shaft.

8 Claims, 9 Drawing Sheets

(56) References Cited

U.S. PATENT DOCUMENTS

2005/0154070 A1* 7/2005 Suzuki .............. B29B 17/0036
                                                       521/40.5
2006/0050127 A1    3/2006 Noda et al.

FOREIGN PATENT DOCUMENTS

| | | |
|---|---|---|
| CN | 2834873 Y | 11/2006 |
| CN | 101139048 A | 3/2008 |
| CN | 101148074 A | 3/2008 |
| CN | 101352910 A | 1/2009 |
| CN | 101926015 A | 12/2010 |
| CN | 201950759 U | 8/2011 |
| CN | 202805496 U | 3/2013 |
| JP | 2-159410 A | 6/1990 |
| JP | 8-132467 A | 5/1996 |
| JP | 10-281139 A | 10/1998 |
| JP | 2001-18226 A | 1/2001 |
| JP | 2012-236324 A | 12/2012 |

* cited by examiner

METHOD FOR MANUFACTURING RESIN-MADE ROLLER SHAFT, MOLDING DIE, AND RESIN-MADE ROLLER SHAFT

BACKGROUND OF THE INVENTION

1. Field of the Invention

The present invention relates to a manufacturing method for obtaining a resin-made roller shaft by injecting a resin material into a die; the molding die; and the resin-made roller shaft.

2. Description of the Related Art

Conventionally, as for a roller shaft which is used for the transportation of paper in a copying machine or a printer, a roller made from rubber has been press-fitted and joined to a metal shaft. In addition, a shaft made from a resin has been used for a roller shaft whose required rigidity is low.

A shape of a key groove or the like is added to a part of an end face of the metal shaft afterward by working, and a post-worked portion has been subjected to plating treatment as a countermeasure for rust prevention.

For this reason, there have been such problems in a weight of a product and a manufacturing cost of the shaft that the weight becomes heavier, an end requires secondary working, and the surface needs to be subjected to plating as rust prevention treatment.

On the other hand, a method of filling a gas into an inner part of a mold when the inner part is filled with a resin, so as to form a hollow structure in the inner part, has been proposed as a method for forming a cylindrical shape in a shaft made from a resin (see Japanese Patent Application Laid-Open No. H08-132467).

In addition, a method of providing a piece in a direction perpendicular to a direction of opening/closing the mold on the end face has been proposed as a method for eliminating a parting line on the end face (see Japanese Patent Application Laid-Open No. 2001-18226).

Furthermore, a method for forming a shape such as a gear on the end face has been proposed (see Japanese Patent Application Laid-Open No. H10-281139).

Figure 14:
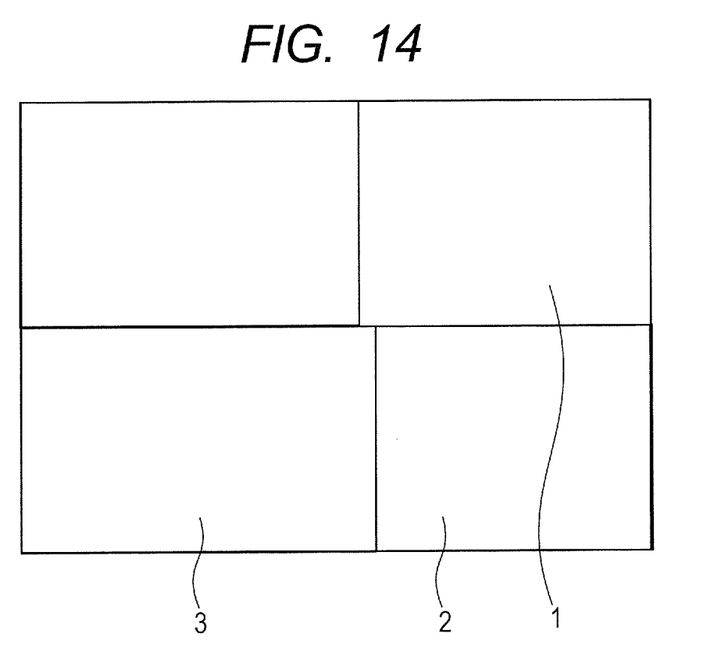
FIG. 14 is a schematic view illustrating a conventional die.
Figure 15:
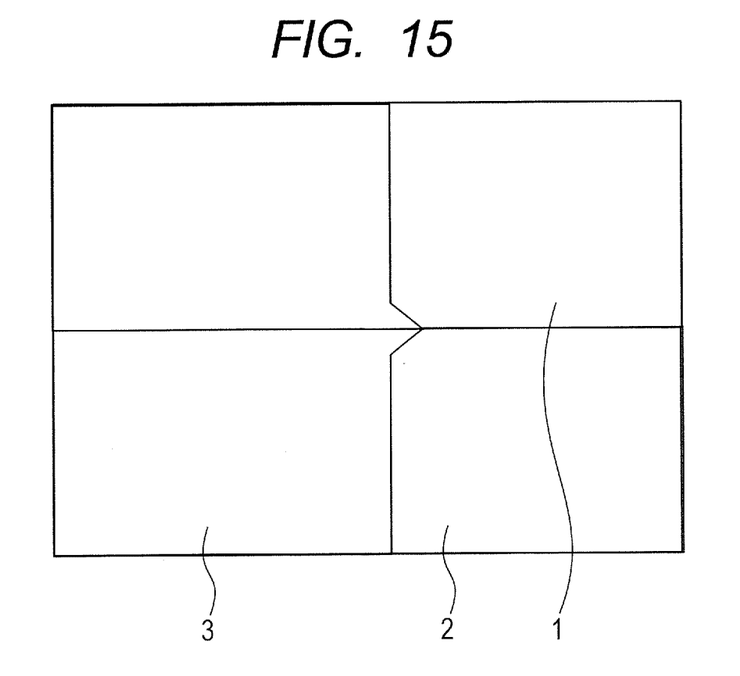
FIG. 15 is a schematic view illustrating a conventional die.

Problems to be solved by the invention will be described below with reference to FIG. 13 to FIG. 15.

Figure 3:
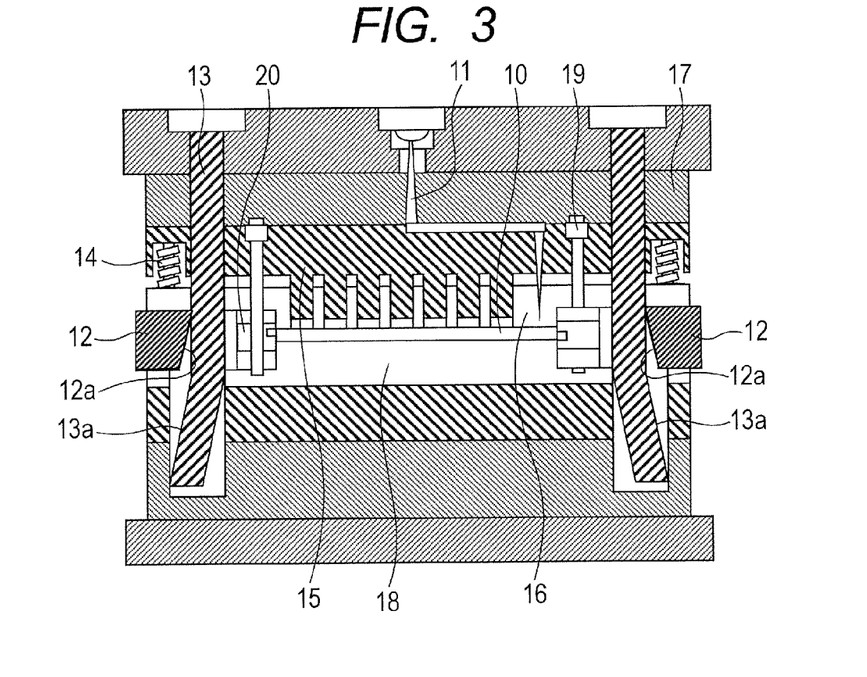
FIG. 3 illustrates a sectional view of the molding die which is used for the method for manufacturing the roller shaft of the present invention, in a state in which the molding die is slightly opened.

FIG. 3 illustrates a sectional view of a die for molding a resin-made roller shaft therein and a roller shaft, which are viewed from a perpendicular direction to the roller shaft. FIG. 14 and FIG. 15 are views in which a step portion of a parting line in FIG. 3 is enlarged. A fixed-side cavity 1, a movable-side cavity 2 and a molded roller shaft 3 are shown.

Figure 13:
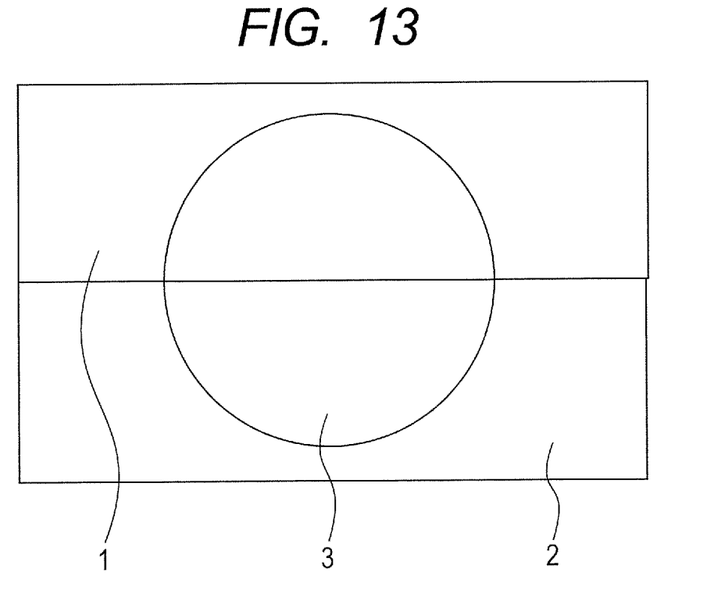
FIG. 13 is a schematic view illustrating a conventional die.

As is illustrated in FIG. 13, conventionally, a die for molding a resin-made roller shaft therein is structured so that the parting line is formed between a fixed side and a movable side. For this reason, a step has been formed on the parting line between the fixed side and the movable side, as is illustrated in FIG. 14 and FIG. 15.

Figure 16:
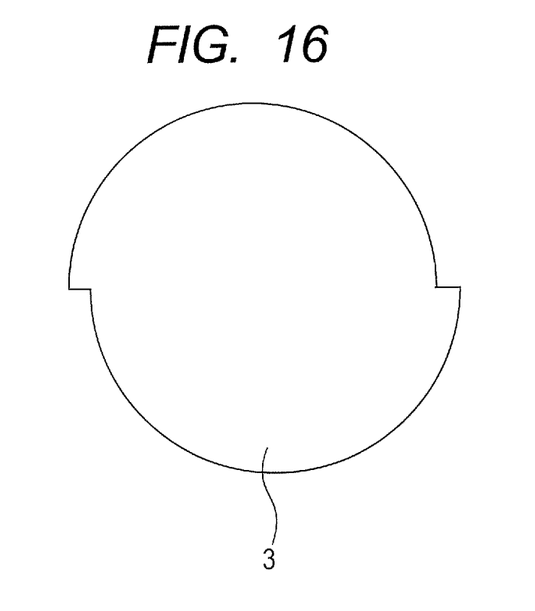
FIG. 16 is a sectional view of a conventional roller shaft.
Figure 17:
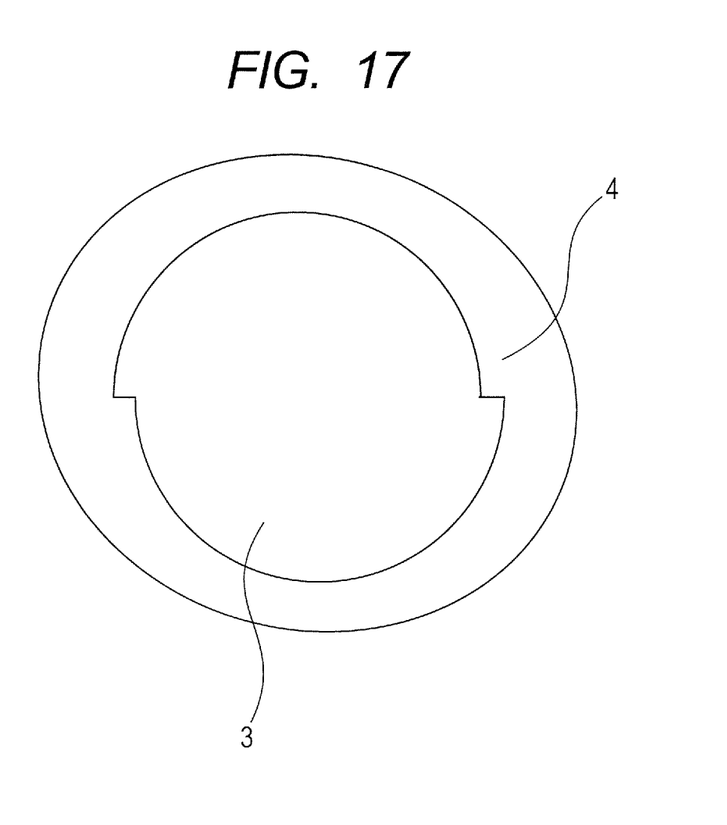
FIG. 17 is a sectional view illustrating a conventional roller shaft in a state in which a rubber roller is mounted on the roller shaft.

As a result, a step and a burr are formed on the parting line also in the roller shaft 3 which has been molded in the die, as is illustrated in FIG. 16. Because of this, the step and the burr which have been formed on the inside roller shaft 3 appear on the surface of a rubber roller 4, after the rubber roller 4 has been press-fitted, and accordingly there has been a problem that the circularity and the cylindricity on the surface of the rubber roller 4 deteriorates, as is illustrated in FIG. 17.

SUMMARY OF THE INVENTION

In order to solve the above-described problems, a molding die for molding a resin-made roller shaft therein according to the present invention is a molding die for molding a resin-made roller shaft therein, which includes: a cavity for molding the roller shaft therein; and a holding member which is a part of the cavity, is provided on an end of the cavity, and molds both ends in an axial direction of the roller shaft, wherein the holding member is rotatable around a axis of the roller shaft which has been molded in the cavity.

In addition, in order to solve the above-described problems, a method for manufacturing a resin-made roller shaft according to the present invention is a method for manufacturing a resin-made roller shaft with use of a molding die, which includes: injecting a resin into a cavity in the molding die and molding the roller shaft; and rotating the roller shaft which is molded in the die, around a axis of the molded roller shaft, after the injection molding is ended.

In addition, in order to solve the above-described problems, a resin-made roller shaft according to the present invention includes shaft portions, and a roller joining portion provided between the shaft portions, wherein a step of the roller joining portion is 10 μm or less, and a step of the shaft portion is 30 μm or more.

The present invention provides the following effects. A step of the parting line at a portion of a resin-made roller shaft, to which a rubber roller is press-fitted and joined, is reduced by the rotation of a rotatable holding member around the axis in a state in which the holding member holds an end of a shaft-forming member.

The step and the burr do not appear, and accordingly the circularity and cylindricity of the rubber roller which is mounted on the joining portion for the rubber roller becomes high.

As a result, the surface precision of the rubber roller becomes high after the rubber roller has been press-fitted and joined to the roller shaft, and surface polish working for the rubber roller can be eliminated, which has been conventionally considered to be necessary.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 2:
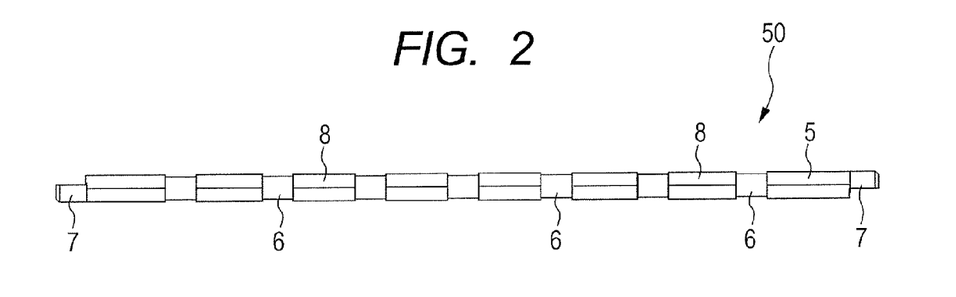
FIG. 2 is a front view illustrating a roller shaft of the present invention.

FIG. 2 illustrates one embodiment of a resin-made roller shaft 50 of the present invention. In the present embodiment, a roller shaft, for instance, will be described below. A roller shaft 50 is provided with a shaft portion 5, a plurality of roller joining portions 6 which are provided between the shaft portion 5 and the shaft portion 5 at a predetermined distance in an axial direction, and a shaft-holding portion 7 which holds the roller shaft 50 at a predetermined position of a die. A rubber roller, for instance, is press-fitted onto the roller joining portion 6. A step 8 of a parting line is formed on the shaft portion 5. As is illustrated in FIG. 2, in the joining portion 6 of the not-shown roller, a step of the parting line is removed or flattened, that is, the step of the parting line decreases, compared to that of the shaft portion 5.

Figure 1:
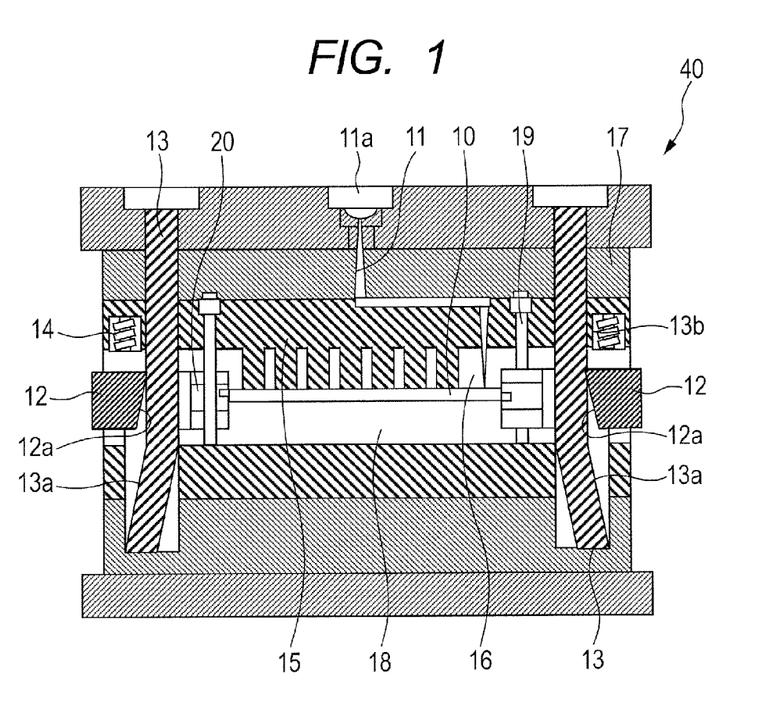
FIG. 1 is a sectional view of a molding die which is used for a method for manufacturing a roller shaft of the present invention.

FIG. 1 illustrates a molding die 40 which is used in one embodiment of a method for manufacturing the resin-made roller shaft of the present invention. The die 40 for manufacturing the roller shaft 50 therein illustrated in FIG. 2 is provided with a shaft-forming member 10 which becomes the roller shaft 50, a runner 11 which supplies a resin material therethrough, a sliding member 12, an angular cam 13 for moving the sliding member 12, and a spring 14. The sliding member 12 can move in the axial direction.

The die 40 is further provided with a plate 17 in which the runner 11 penetrates, a first plate 15 which is arranged below the plate 17, a rack shaft 19 which is fixed on the plate 17, a second plate 16 which is arranged below the first plate 15, a third plate 18 which is arranged below the first plate 15 and the second plate 16, and has a space (cavity) for molding the shaft-forming member 10 between itself and the plate 15 and/or the plate 16, and a holding member 20 which is a part of the space (cavity) for molding the shaft-forming member 10, has a space (cavity) for molding the shaft-holding portion 7 of the shaft-forming member 10 and can rotate. The first plate 15 has a shape for molding a portion at which the step of the parting line may be formed, and the second plate 16 has a shape for molding a portion at which the step of the parting line is desired to be reduced as much as possible. In the present embodiment, the first plate 15 has a molding face having a shape for molding, for instance, the shaft portion 5 illustrated in FIG. 2. The second plate 16 has a molding face having a shape for molding, for instance, the joining portion 6 for the rubber roller illustrated in FIG. 2. The holding member 20 is provided on an end of the cavity of the die 40.

In FIG. 1, a resin material which is supplied from a not-shown supply source is supplied to the runner 11 through an opening 11a of the runner. The resin material which has passed through the runner 11 is filled into the cavity which is formed by the first plate 15, the second plate 16, the third plate 18 and the holding member 20. After the process of filling the inside of the molding die with the resin material which has been injected into the inside has been ended, the die 40 is opened to just the front of the position at which a tapered face 13a of the angular cam 13 abuts on a tapered face 12a of the sliding member 12, by a mold-opening operation of a molding machine.

As is understood from FIG. 1, the sliding member 12 has the tapered face 12a provided thereon which has a predetermined angle in the axial direction. In addition, the angular cam 13 has the tapered face 13a provided thereon which has the same tilt angle as that of the tapered face 12a of the slide 12, and a straight face 13b. Accordingly, even when the mold opening starts and the angular cam 13 is upwardly displaced, the sliding member 12 does not move until the tapered face 13a abuts on the tapered face 12a, because the straight face 13b is provided.

FIG. 3 illustrates a sectional view of the molding die which is used for the method for manufacturing the roller shaft of the present invention, in a state in which the molding die is slightly opened. In this case, the die 40 is opened by approximately 10 mm. As is illustrated in FIG. 3, when the die 40 starts being opened, firstly, the first plate 15 moves due to a pressing force of the spring 14, and a clearance is formed between the first plate 15 and the second plate 16. In other words, the molding face of the second plate 16 that has a shape for molding a shape (for instance, joining portion 6 for rubber roller) of the shaft-forming member 10, in which the step of the parting line is desired to be reduced as much as possible, keeps contact with the resin material which is filled in the cavity. A molding face of the first plate 15 which has a shape for molding a shape for molding another portion (for instance, shaft portion 5) than the above portion, in which the step of the parting line may be formed, is separated from the resin material which has been filled into the cavity, and a clearance is formed. As a result, an obstacle appearing when a molded article is rotated decreases, and the rotation becomes easy.

Figure 4:
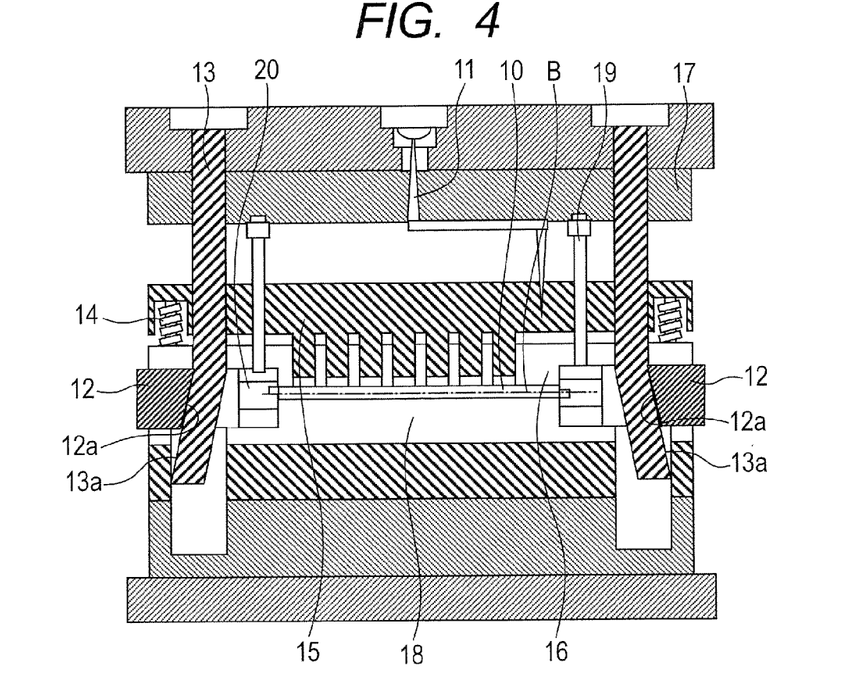
FIG. 4 illustrates a sectional view of the molding die which is used for the method for manufacturing the roller shaft of the present invention, in a state in which the molding die is further opened than that in FIG. 3.

FIG. 4 illustrates a sectional view of one embodiment of the molding die which is used for the method for manufacturing the roller shaft of the present invention, in a state in which the molding die is further opened than that in FIG. 3. FIG. 4 illustrates the state in which the die is opened to just the front of a position at which the tapered face 13a of the angular cam 13 abuts on the tapered face 12a of the sliding member 12.

As is illustrated in FIG. 4, when the die 40 is further opened from the state of FIG. 3, a space between the plate 17 and the first plate 15 is opened. After that, the holding member 20 which has a pinion gear, holds the shaft-holding portion 7 (shaft end 31) as-is after the shaft-holding portion 7 has been molded and can rotate, rotationally drives itself around a center line B (axis) of the shaft of the molded article (shaft-forming member 10) by a rack shaft 19 that is fixed on the plate 17, and rotates the shaft-forming member 10.

At this time, the step of a parting line 8 in a portion which is formed to become the roller joining portion of the molded article (shaft-forming member 10) rotates while coming in contact with an edge portion and a wall face in the cavity.

As a result, the step of the parting line can be cut by the wall face or can be plastically deformed by the wall face, and the step of the parting line can be reduced.

In addition, the above-described rotating operation is performed in a state in which the second plate 16 and the third plate 18 that are main partings are closed, and the main partings are opened after a cooling process has been ended.

Figure 5:
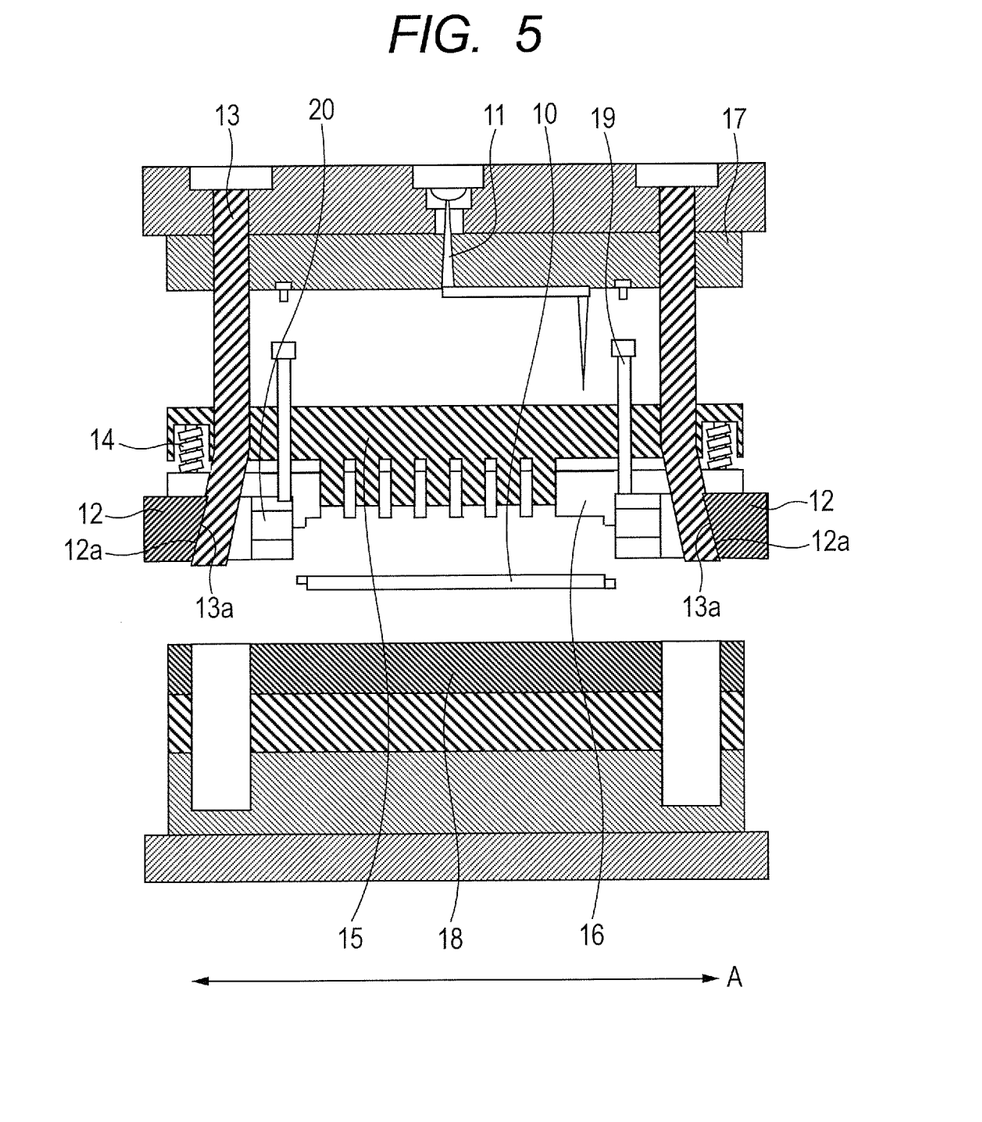
FIG. 5 illustrates a sectional view of the molding die which is used for the method for manufacturing the roller shaft of the present invention, in a state in which the molding die is completely opened.

FIG. 5 is a sectional view of the molding die which is used for the method for manufacturing the roller shaft of the present invention, in a state in which the die is completely opened.

As is illustrated in FIG. 5, the plate 16 and the plate 18 which become the main partings are opened, and the sliding member 12 moves to an axial direction A due to the angular cam 13. Then, the molded article (shaft-forming member 10) is enabled to be released from the die, and is taken out as the roller shaft 50 which is a final molded article.

As has been described in FIG. 3 to FIG. 5, the die 40 of the present invention has a slide structure which has the rotatable holding member 20 that has a molding face having a shape for molding the shaft-holding portion 7 (shaft end 31) for holding the roller shaft 50, on the end of the cavity for forming the roller shaft 50 therein.

Furthermore, the die 40 has a mechanism for rotating the rotatable holding member 20. By the rotation of the shaft-forming member 10 in an injection molding process with the use of the die 40 of the present invention, the step of the parting line at the portion of the resin-made roller shaft 50 is removed or flattened, at which a rubber roller is press-fitted and joined, and thereby is enabled to be reduced.

Figure 6:
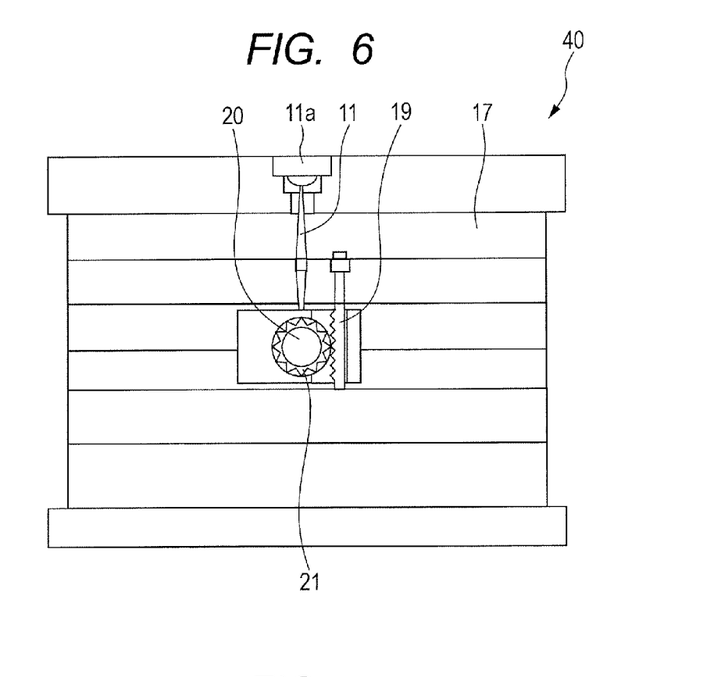
FIG. 6 is a view of a die of the present invention, which is viewed from the side face of a shaft cavity.

FIG. 6 is a view of the die 40 of the present invention, which is viewed from the side face of a shaft cavity. As is illustrated in FIG. 6, the rotatable holding member 20 which has a cavity shape for thereby holding the shaft end 31 of the shaft-forming member 10 has a pinion gear 21.

When the die 40 starts the opening operation after the filling process of the injection molding process has been ended, the rack shaft 19 fixed on the plate 17 is threadedly engaged with the pinion gear 21 of the holding member 20, and the rotatable holding member 20 rotationally drives the shaft-forming member 10 in the die 40 while holding the end 31 of the shaft-forming member 10, in synchronization with the rack shaft 19. The holding member 20 is rotated according to the vertical movement of the rack shaft 19.

Figure 7:
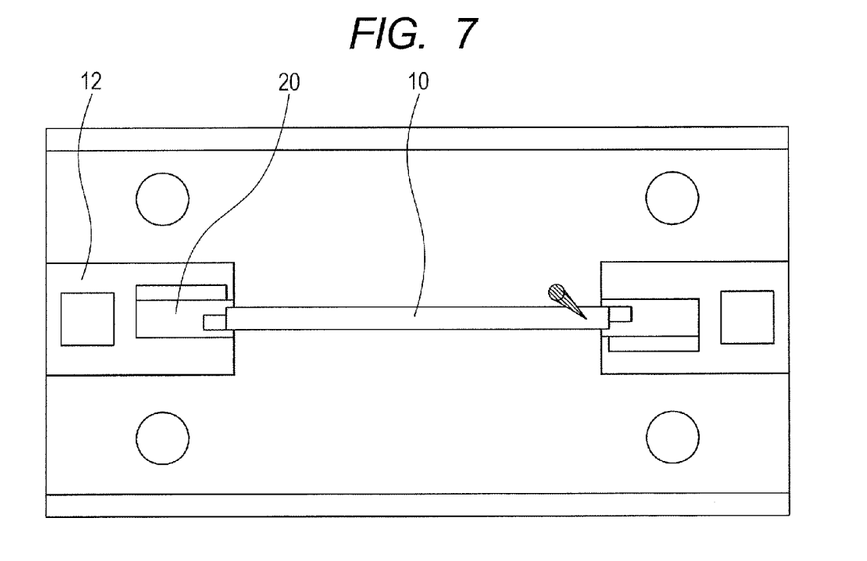
FIG. 7 is a view of a movable side of the die in the present invention, which is viewed from the upper part (mold opening direction) thereof.

FIG. 7 is a view of a movable side of the die of the present invention, which is viewed from the upper part (mold opening direction) thereof. As is illustrated in FIG. 7, after the filling process has been ended and the cooling process of the injection molding process has been ended, the sliding member 12 having the rotatable holding member 20 which holds the shaft end 31 of the shaft-forming member 10 moves in a perpendicular direction to the shaft-forming member 10, and thereby the shaft-forming member 10 can be released.

Figure 8:
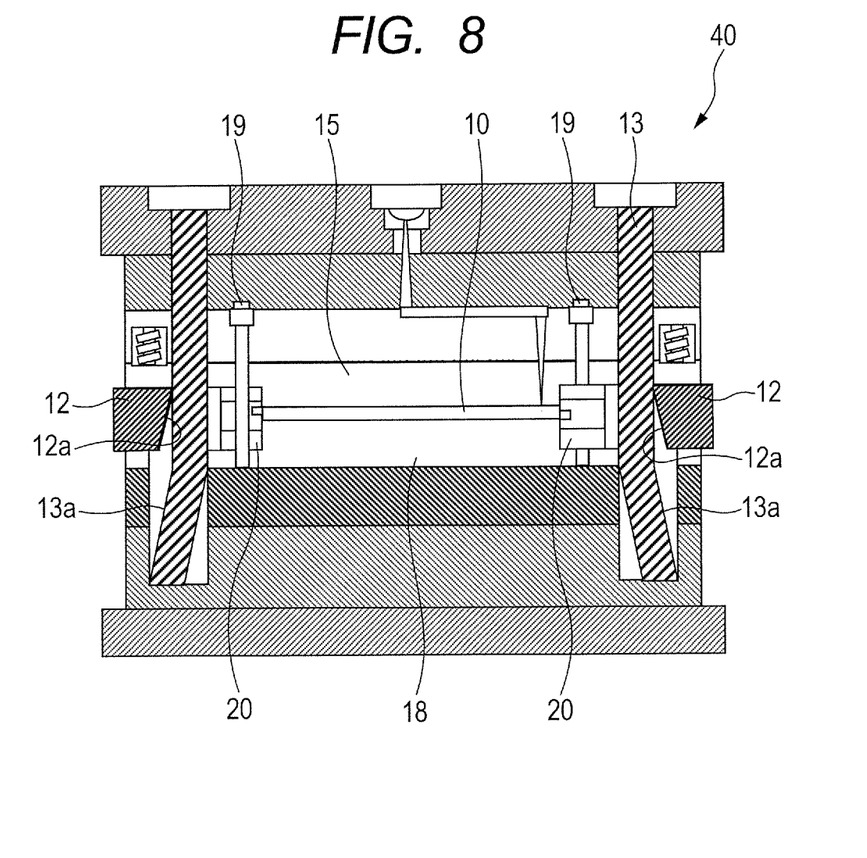
FIG. 8 is a sectional view of a die of the second exemplary embodiment according to the present invention.

FIG. 8 illustrates a die of a second exemplary embodiment according to the present invention. In the second exemplary embodiment illustrated in FIG. 8, the cavity shape that forms the shaft-forming member 10 is formed only from the first plate 15 and the third plate 18, which is different from the die 40 in FIG. 1. When the form is compared to that in the first exemplary embodiment, the first plate 15 and the second plate 16 are integrated.

A clearance is not formed between the shaft-forming member 10 and the wall face of the cavity until the first plate 15 and the third plate 18 which become the main partings are opened after the die 40 has started opening the mold. Because of this, the step of the parting line in all of the shaft portions 5 except for the holding shape of the shaft end 31 of the shaft-forming member 10 are removed or flattened.

Figure 9:
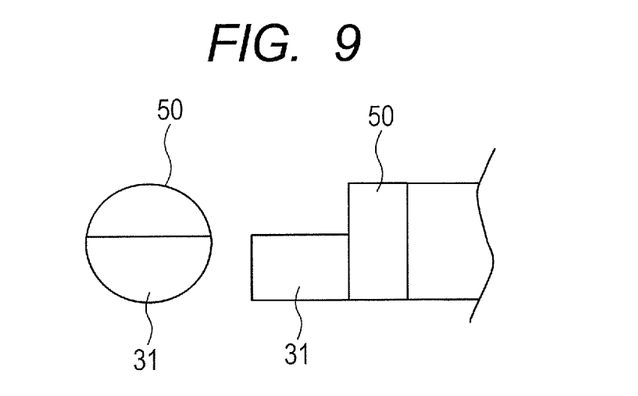
FIG. 9 is a front view and a side view illustrating one example of a shape of an end in an axial direction of a roller shaft of the present invention.
Figure 10:
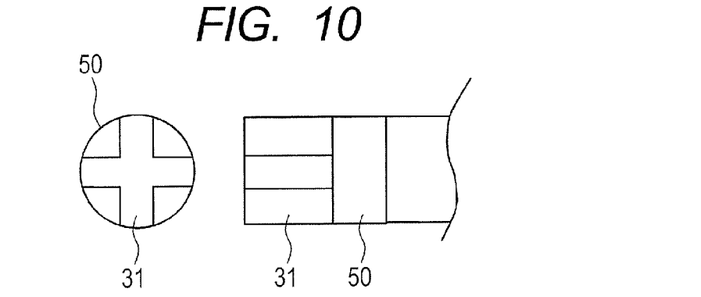
FIG. 10 is a front view and a side view illustrating another example of a shape of the end in the axial direction of the roller shaft.
Figure 11:
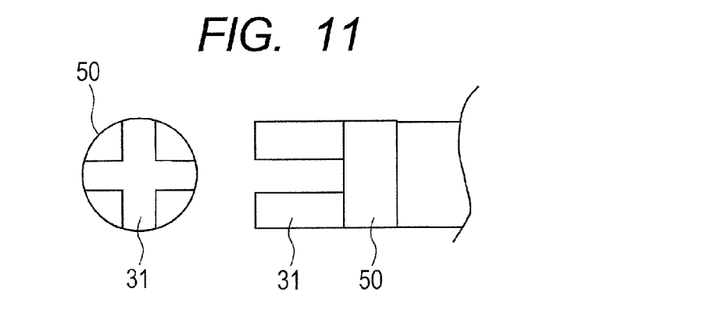
FIG. 11 is a front view and a side view illustrating further another example of a shape of the end in the axial direction of the roller shaft of the present invention.

FIG. 9 to FIG. 11 are front views and side views illustrating each example of shapes of both ends 31 in the axial direction of the roller shaft 50 (shaft-forming member 10) of one embodiment of the present invention. In the example illustrated in FIG. 9, the shaft end 31 is formed into such a shape that a part of the end having a circular cross-section has been removed. The shaft end 31 is formed as a protrusion having a shape which is slightly larger than a semicircle when viewed from the front face.

In the example illustrated in FIG. 10, the shaft end 31 is formed whose cross-sectional shape is a protruding cross shape. In the example illustrated in FIG. 11, the shaft end 31 is formed whose cross-sectional shape is a recessed cross shape. In contrast to the case of FIG. 10, a cross-shaped space is formed.

The shape of the shaft end 31 may be a non-circular shape, is not limited to the above-described shape as long as the holding member 12 can rotatably hold the shaft-forming member 10, and can be another shape. The holding member 20 may have any shape as long as the holding member can be engaged with the end of the roller shaft 50 and has a complementary shape.

Figure 12:
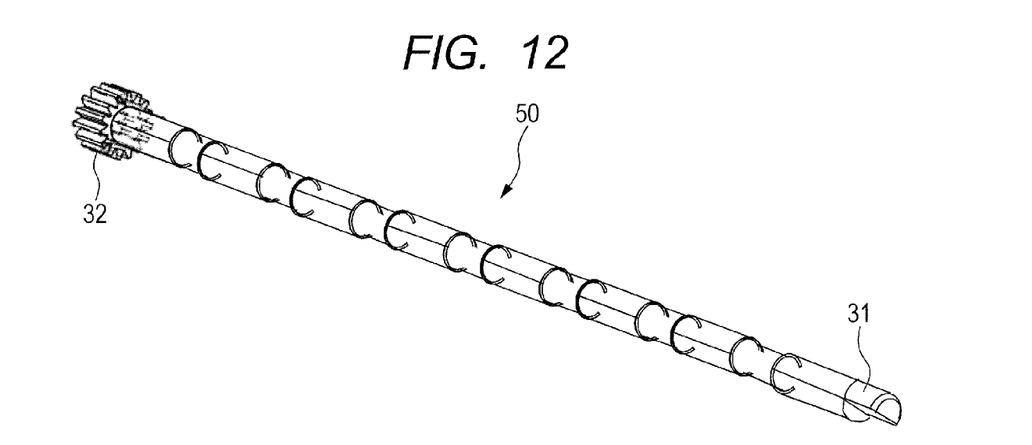
FIG. 12 is a perspective view illustrating a roller shaft which has been molded with the use of the manufacturing method and the molding die of the present invention.

FIG. 12 is a perspective view illustrating one embodiment of a shaft which has been molded with the use of the manufacturing method and the molding die of the present invention. In FIG. 12, one end of the roller shaft 50 in an axial direction is the shaft end 31 which is formed into the non-circular shape illustrated in FIG. 9, but the other end is integrally molded with a gear portion 32. The shapes of the right and left shaft ends in the axial direction of the shaft-forming member 10 (roller shaft 50) which is held by the holding member 20 may not be the same. There is no problem even when the right and left shapes are different as are illustrated in FIG. 12. For this reason, the gear portion 32 can be integrally molded with the shaft, which is conventionally mounted on the shaft as other parts.

Exemplary Embodiment 1 to Exemplary Embodiment 4

Table 1 shows resin materials which were used for the roller shafts 50 that were molded with the use of the die (die 40 illustrated in FIG. 1) of the present invention and dimensions of finished articles, respectively.

TABLE 1

|  | Comparative example | Exemplary embodiment 1 | Exemplary embodiment 2 | Exemplary embodiment 3 | Exemplary embodiment 4 |
|---|---|---|---|---|---|
| Resin material | HIPS | HIPS | ABS | PC | PC + ABS |
| Shaft diameter mm | φ7 | φ7 | φ7 | φ7 | φ7 |
| Shaft length mm | 250 | 250 | 250 | 250 | 250 |

TABLE 1-continued

|  | Comparative example | Exemplary embodiment 1 | Exemplary embodiment 2 | Exemplary embodiment 3 | Exemplary embodiment 4 |
|---|---|---|---|---|---|
| Diameter of roller joining portion mm | φ6 | φ6 | φ6 | φ6 | φ6 |
| Number of roller joining portion | 5 | 5 | 5 | 5 | 5 |
| Circularity of roller μm | 50 | 24 | 19 | 21 | 23 |
| PL step of shaft portion μm | 0.05 | 0.05 | 0.05 | 0.05 | 0.05 |
| PL step of roller joining portion μm | 0.05 | 0.008 | 0.005 | 0.009 | 0.009 |

In Table 1, Comparative Example is an example which has been formed with a conventional die and manufacturing method, and the roller shaft is molded without being rotationally driven. Exemplary Embodiment 1 to Exemplary Embodiment 4 show the results of the roller shafts which have been molded with the use of the die and the manufacturing method of the present invention. In Table 1, HIPS is impact resistant polystyrene, ABS is acrylonitrile butadiene styrene, and PC is polycarbonate.

In Comparative Example, the steps of the parting line, which were equivalent to that in the shaft portion, were formed not only in the shaft portion but also in a portion to which a rubber roller was press-fitted and joined, and accordingly the circularity after the rubber roller was mounted deteriorated.

On the other hand, in Exemplary Embodiment 1 to Exemplary Embodiment 4, the step of the parting line in the roller joining portion is removed or flattened, compared to the step of the parting line of the shaft portion with Φ7. Because of this, the step of the parting line is reduced, and the circularity after the rubber roller has been press-fitted and joined is far adequate compared to that in the conventional example.

As is shown in Table 1, it has been verified that the roller shaft which is manufactured with the use of the die and the manufacturing method of the present invention is excellent in all of the component precision and component function, compared to Conventional Example.

Exemplary Embodiment 5 to Exemplary Embodiment 9

Table 2 shows resin materials which were used for the roller shafts 50 that were molded with the use of the die (die 40 illustrated in FIG. 1) of the present invention and dimensions of finished articles, respectively.

TABLE 2

|  | Exemplary embodiment 5 | Exemplary embodiment 6 | Exemplary embodiment 7 | Exemplary embodiment 8 | Exemplary embodiment 9 |
|---|---|---|---|---|---|
| Resin material | PC + GF50 | PPO + PS + GF30 | PBT + GF30 | PPS + GF50 | LCP + GF50 |
| Shaft diameter nm | φ7 | φ7 | φ7 | φ7 | φ7 |
| Shaft length mm | 250 | 250 | 250 | 250 | 250 |
| Diameter of roller joining portion mm | φ6 | φ6 | φ6 | φ6 | φ6 |
| Number of roller joining portion | 5 | 5 | 5 | 5 | 5 |
| Circularity of roller μm | 21 | 19 | 25 | 24 | 24 |
| PL step of shaft portion μm | 0.04 | 0.04 | 0.04 | 0.1 | 0.04 |
| PL step of roller joining portion μm | 0.005 | 0.004 | 0.007 | 0.006 | 0.007 |

In Table 2, types of materials in Exemplary Embodiment 5 to Exemplary Embodiment 9 are all different, and a reinforcing material of a glass filler is filled in all of the resin materials which are used, so as to enhance rigidity of the roller shaft.

As a result of having molded each material with the use of the die and the manufacturing method of the present invention, the component precision of the resins which were reinforced by various types of the glass fillers was enhanced compared to that of the resin materials having no reinforcing material, which were described in Table 1.

In particular, Exemplary Embodiment 6 could attain quality and precision equivalent in the circularity of the roller joining portion and the step of the roller joining portion, to those of a component in which a rubber roller was joined to a metal shaft.

In addition, also in the case where the roller shaft was molded of the resin material in which the reinforcing material of the glass filler was filled, the shaft-forming member was rotated without causing a problem, and the step of the parting line (PL) could be removed or flattened.

In Table 2, PRO means modified polyphenylene ether, PS means polystyrene, PBT means polybutylene terephthalate, PPS means polyphenylene sulfide, and LCP means a liquid crystal polymer. In addition, GF30 and GF50 represent mixture ratios (%) of the glass filler, respectively.

Exemplary Embodiment 10 to Exemplary Embodiment 13

Table 3 shows resin materials which were used for the roller shafts 50 that had the gear portion 32 illustrated in FIG. 12 integrally molded on one end in the axial direction with the use of the die (die 40 illustrated in FIG. 1) of the present invention and dimensions of finished articles, respectively.

TABLE 3

|  | Exemplary embodiment 10 | Exemplary embodiment 11 | Exemplary embodiment 12 | Exemplary embodiment 13 |
|---|---|---|---|---|
| Shaft material | POM | PC + GF50 | PPS + GF50 | LCP + GF50 |
| Shaft diameter mm | φ7 | φ7 | φ7 | φ7 |
| Shaft length mm | 250 | 250 | 250 | 250 |
| Gear material | POM | POM | POM | POM |
| Diameter of roller joining portion mm | φ6 | φ6 | φ6 | φ6 |
| Number of roller joining portion | 7 | 7 | 7 | 7 |
| Straightness of shaft mm | 0.12 | 0.04 | 0.07 | 0.06 |
| Circularity of roller μm | 35 | 17 | 21 | 20 |
| PL step of shaft portion μm | 0.05 | 0.04 | 0.07 | 0.04 |
| PL step of roller joining portion μm | 0.009 | 0.005 | 0.006 | 0.006 |

In each of Exemplary Embodiments illustrated in Table 3, a small injecting unit is mounted on the die, and two-color molding is performed.

In Table 3, Exemplary Embodiment 10 is an example in which all portions were molded of a POM (polyacetal) material. The POM resin has a large molding shrinkage rate compared to that of the other resin. Due to the influence, the precisions of the shaft and the roller joining portion resulted in being inferior.

On the other hand, in the columns of Exemplary Embodiment 11 to Exemplary Embodiment 13, the results of the roller shafts are shown in which the shafts were molded with the use of materials in which the reinforcing materials of the glass filler were filled, and only the gear portions 32 were molded with the use of POM material, respectively. Exemplary Embodiment 11 to Exemplary Embodiment 13 showed such results that the precisions of the shaft and the roller joining portion could almost satisfy a standard.

In addition, the shape precisions of the gear portions 32 were almost same in any roller shaft of Exemplary Embodiment 10 to Exemplary Embodiment 13, and satisfied the standard.

In Table 3, PPS is polyphenylene sulfide and LCP is a liquid crystal polymer.

In the above-described exemplary embodiments, a glass filler was used as a filler for reinforcing the resin, but the resin can be reinforced by the fill with a carbon fiber, talc and a plate-like filler into the resin. In addition, these fillers can be used also in combination with others.

From the above-described Exemplary Embodiments 1 to 13, it is understood that the step of the parting line at the roller joining portion 6 is 10 μm or less, and the step of the parting line at the shaft portion 5 except the roller joining portion 6 is 30 μm or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-116687, filed Jun. 3, 2013, which is hereby incorporated by reference herein in its entirety.

What is claimed is:

1. A molding die for molding a resin-made roller shaft therein comprising:
    a cavity for molding the roller shaft therein; and
    a holding member, which is a part of the cavity, provided on an end of the cavity such that both ends of the roller shaft can be molded in an axial direction,
    wherein the cavity is formed by at least a first plate and a second plate, and the molding die comprises a spring configured to move the first plate, and
    wherein the holding member is rotatable by moving the first plate by the spring at a condition that the first plate is separated from the resin material filled in the cavity so that a step of a parting line at a portion that is formed by the second plate is reduced.

2. The molding die according to claim 1, wherein the holding member comprises a sliding member which is movable in the axial direction.

3. The molding die according to claim 1, wherein the holding member comprises a pinion gear, rotates by the pinion gear which is threadedly engaged with a rack shaft that moves in synchronization with an opening operation of the molding die, and thereby rotates the roller shaft.

4. The molding die according to claim 1, wherein the holding member has a complementary shape to a shape of a shaft end of the roller shaft.

5. A method for manufacturing a resin-made roller shaft with use of a molding die, comprising:
    injecting a resin material into a cavity in the molding die, where the cavity is formed by at least a first plate and a second plate;

moving the first plate to separate the first plate from the resin material filled in the cavity; and rotating the resin material in the cavity to reduce a step of a parting line at a portion that is formed by the second plate after the first plate is separated from the resin material.

6. A resin-made roller shaft comprising shaft portions, and a roller joining portion provided between the shaft portions, wherein a step of the roller joining portion is 10 μm or less, and a step of the shaft portion is 30 μm or more.

7. The resin-made roller shaft according to claim 6, further comprising a gear portion or a non-circular shape on a shaft end.

8. The resin-made roller shaft according to claim 7, comprising a resin reinforced by any material selected from the group consisting of a glass filler, a carbon fiber, talc, and a plate-shaped filler, wherein the gear portion formed on the shaft end is made from a POM material.

* * * * *